United States Patent
Yoshida

(10) Patent No.: US 8,880,755 B2
(45) Date of Patent: Nov. 4, 2014

(54) TRANSMISSION DEVICE AND TRANSMISSION METHOD

(71) Applicant: Fujitsu Limited, Kawasaki (JP)

(72) Inventor: Hiroshi Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/716,178

(22) Filed: Dec. 16, 2012

(65) Prior Publication Data

US 2013/0246669 A1 Sep. 19, 2013

(30) Foreign Application Priority Data

Mar. 16, 2012 (JP) ................................. 2012-061190

(51) Int. Cl.
| | | |
|---|---|---|
| G06F 3/00 | (2006.01) | |
| G06F 13/00 | (2006.01) | |
| G06F 11/34 | (2006.01) | |
| H04L 1/00 | (2006.01) | |

(52) U.S. Cl.
CPC .............................. *G06F 11/3485* (2013.01); *H04L 1/0001* (2013.01)
USPC ................................... 710/18; 710/8; 710/33

(58) Field of Classification Search
None
See application file for complete search history.

(56) References Cited

U.S. PATENT DOCUMENTS

| 7,830,985 B2 | 11/2010 | Black et al. | |
|---|---|---|---|
| 2004/0236873 A1* | 11/2004 | Kasame et al. | 710/1 |

FOREIGN PATENT DOCUMENTS

| JP | 2007-505576 | 3/2007 |
|---|---|---|
| WO | WO-2005/027443 | 3/2005 |

* cited by examiner

Primary Examiner — Zachary K Huson
(74) Attorney, Agent, or Firm — Fujitsu Patent Center

(57) ABSTRACT

A transmission device includes: an FPGA that configures a port processing circuit in a line interface which communicates with an XFP; and a flash memory that stores configuration information for configuring, in the FPGA, a measurement circuit that measures and acquires a transmission parameter for use in communication between the XFP and the port processing circuit; and an FPGA control unit that configures the measurement circuit in a portion of the port processing circuit based on the configuration information read from the flash memory, upon detecting a loop-back connection with the XFP. The measurement circuit measures and acquires a transmission parameter. The FPGA control unit sets the acquired transmission parameter to the line interface, and reconfigures the measurement circuit in the port processing circuit.

11 Claims, 10 Drawing Sheets

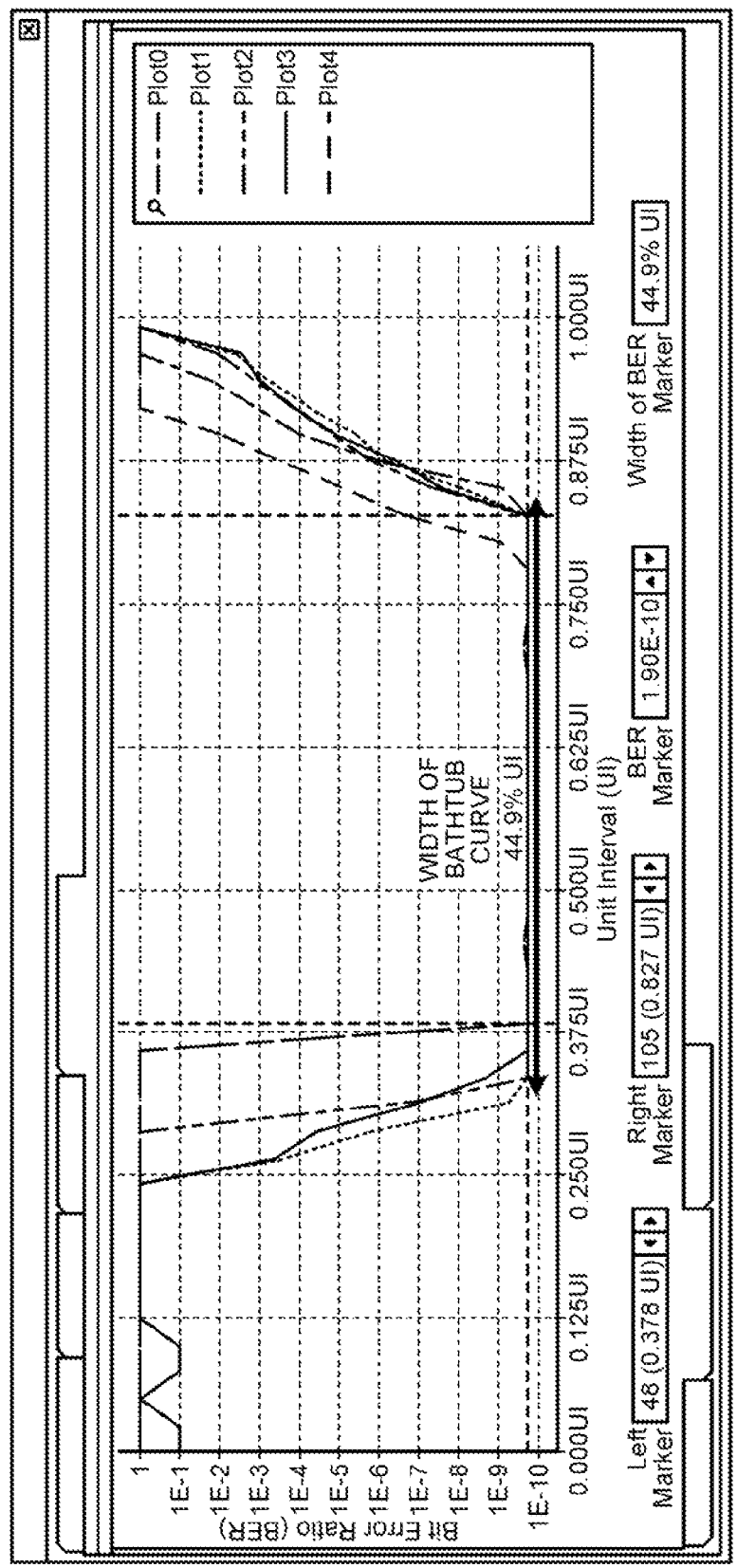

TRANSMISSION DEVICE AND TRANSMISSION METHOD

CROSS-REFERENCE TO RELATED APPLICATION

This application is based upon and claims the benefit of priority of the prior Japanese Patent Application No. 2012-061190, filed on Mar. 16, 2012, the entire contents of which are incorporated herein by reference.

FIELD

The embodiments discussed herein are directed to a transmission device and a transmission method.

BACKGROUND

A transmission device that accommodates a high-speed line exceeding 10 Gbps, for example, is removably connected to a photoelectric conversion circuit such as an XFP (10 Gigabit Small Form Factor Pluggable). The transmission device includes an FPGA (Field-Programmable Gate Array) that configures a communication circuit, which communicates with the connected XFP, based on set configuration information.

The transmission device incorporates an equalizer which is formed at the pre-stage of the communication circuit to adjust a high-speed signal, for example. The equalizer adjusts the waveform or the like of the high-speed signal that has deteriorated on a transmission path with the XFP. The transmission device can be removably connected to XFPs of various specifications.

Patent Document 1: Japanese National Publication of International Patent Application No. 2007-505576

In the transmission device, however, the set value of the equalizer is fixed and the level of the high-speed signal is uniformly adjusted. Accordingly, when the XFP is replaced with another XFP, the level adjustment suitable for another XFP is not achieved and the transmission speed is limited, for example, so that it is difficult to secure the transmission quality suitable for the replaced XFP.

SUMMARY

According to an aspect of an embodiment, a transmission device includes: a configurable device that configures a port processing circuit based on set configuration information, the port processing circuit being configured to communicate with a connected communication module; a memory that stores configuration information for configuring a measurement circuit in the device, the measurement circuit being configured to measure and acquire a transmission parameter for use in communication between the communication module and the port processing circuit; and a controller that reads out the configuration information from the memory upon detection of a loop-back connection with the communication module, configures the measurement circuit in a portion of the port processing circuit based on the read configuration information, and causes the measurement circuit to measure The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is an explanatory diagram illustrating an example of a bathtub curve;

DESCRIPTION OF EMBODIMENTS

Preferred embodiments of the present invention will be explained with reference to accompanying drawings. Note that the technique disclosed herein is not limited by the embodiments described below. The embodiments shown below may be combined as needed without causing any contradiction.

[a] First Embodiment

Figure 1:
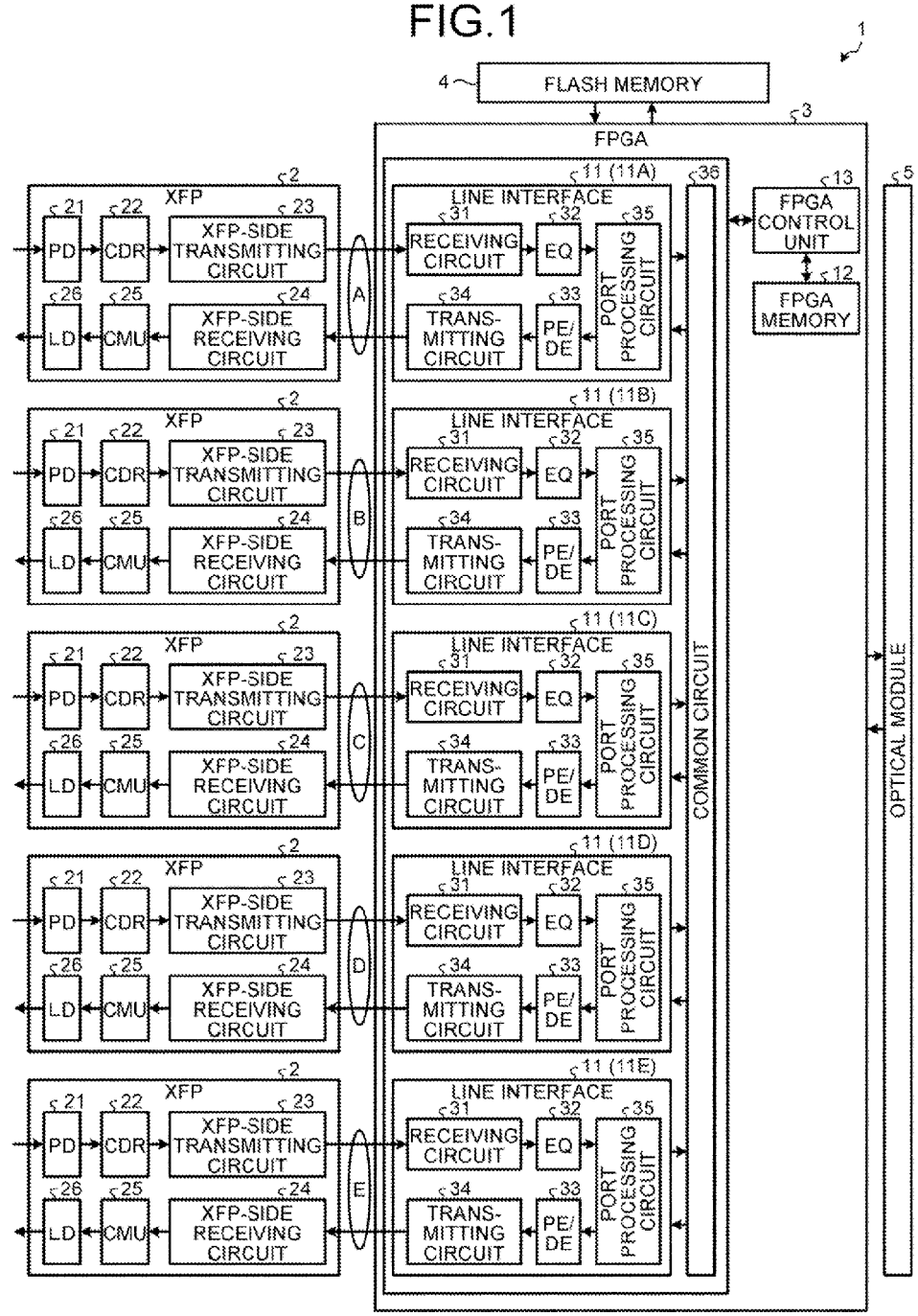
FIG. 1 is a block diagram illustrating an example of a configuration of a transmission device of a first embodiment.

FIG. 1 is a block diagram illustrating an example of a configuration of a transmission device according to a first embodiment. A transmission device 1 illustrated in FIG. 1 includes a configurable Field-Programmable Gate Array (FPGA) 3 which is removably connected to a plurality of XFPs (10 Gigabit Small Form Factor Pluggable) 2, a flash memory 4, and an optical module 5. Note that the FPGA 3 includes communication ports A to E which are connectable to five XFPs 2, for example.

Each XFP 2 includes a PD (Photo Diode) 21, a CDR (Clock Data Recovery) 22, an XFP-side transmitting circuit (Driver) 23, an XFP-side receiving circuit (receiver) 24, a CMU (Clock Multiplication Unit) 25, and an LD (Laser Diode) 26. The PD 21 is a light receiving element that receives an optical signal and converts the optical signal into an electrical signal. The CDR 22 separates the electrical signal into a data portion and a clock portion based on a reference clock. The XFP-side transmitting circuit 23 transmits the electrical signal corresponding to the data portion to the FPGA 3.

The XFP-side receiving circuit 24 receives the electrical signal corresponding to the data portion received from the FPGA 3. The CMU 25 generates a clock for transmitting the received electrical signal corresponding to the data portion based on the clock. The LD 26 is a light emitting element that converts the electrical signal corresponding to the data portion into an optical signal based on the clock.

The FPGA 3 includes line interfaces 11 (11A to 11E), an FPGA memory 12, and an FPGA control unit 13. The line interface 11A is connected to a communication port A. The line interface 11B is connected to a communication port B. The line interface 11C is connected to a communication port C. The line interface 11D is connected to a communication port D. The line interface 11E is connected to a communication port E. Each line interface 11 includes a receiving circuit 31, an equalizer (EQ) 32, a transmitting circuit 34, a Pre-Emphasis (PE)/De-Emphasis (DE) 33, and a port processing circuit 35.

The receiving circuit 31 receives the electrical signal from the XFP-side transmitting circuit 23 in the corresponding XFP 2. The EQ 32 is a DEF (Decision Feedback)-EQ including a feedback function that adjusts the level of the frequency characteristic of the electrical signal received by the receiving circuit 31. The PE/DE 33 adjusts the level of the electrical signal. The transmitting circuit 34 transmits the electrical signal, the level of which is adjusted by the PE/DE 33, to the XFP-side receiving circuit 24. The port processing circuit 35 performs signal processing on the received electrical signal. A common circuit 36 is a circuit that distributes the electrical signal acquired by the port processing circuit 35 of each line interface 11.

The FPGA control unit 13 configures circuits, such as the port processing circuit 35 and the common circuit 36 in the line interface 11, for example, based on the configuration information stored in the flash memory 4. Note that the FPGA control unit 13 partially configures a plurality of circuits in the FPGA 3 by using a PR (Partial Configuration) technique. The FPGA memory 12 stores various information to be used in the FPGA 3, such as transmission parameters.

Figure 2:
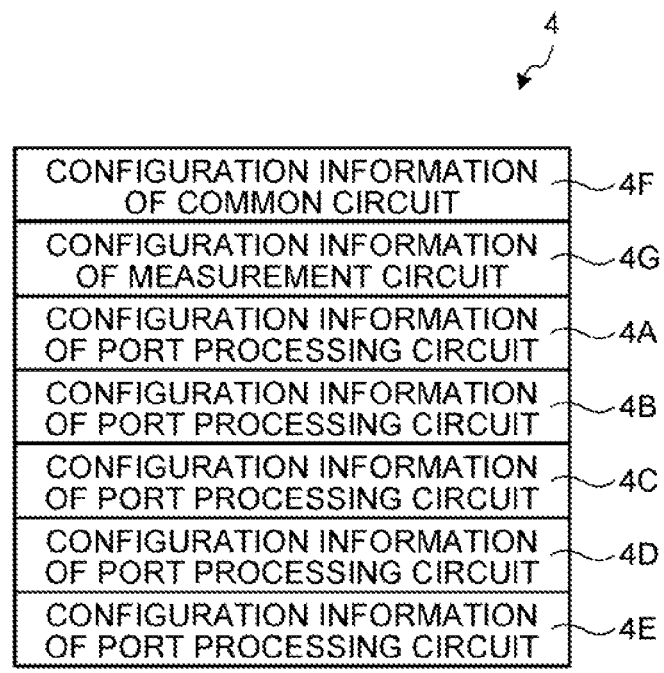
FIG. 2 is an explanatory diagram illustrating an example of a flash memory.

The flash memory 4 stores configuration information for configuring the circuits set in the FPGA 3. FIG. 2 is an explanatory diagram illustrating an example of the flash memory 4. The flash memory 4 illustrated in FIG. 2 stores configuration information 4F for configuring the common circuit 36 in the FPGA 3, and configuration information 4G for configuring a measurement circuit 37, which is described later, in the FPGA 3. The flash memory 4 stores configuration information 4A for configuring the port processing circuit 35 in the line interface 11A, and configuration information 4B for configuring the port processing circuit 35 in the line interface 11B. The flash memory 4 stores configuration information 4C for configuring the port processing circuit 35 in the line interface 11C, and configuration information 4D for configuring the port processing circuit 35 in the line interface 11D. The flash memory 4 stores configuration information 4E for configuring the port processing circuit 35 in the line interface 11E.

Figure 3:
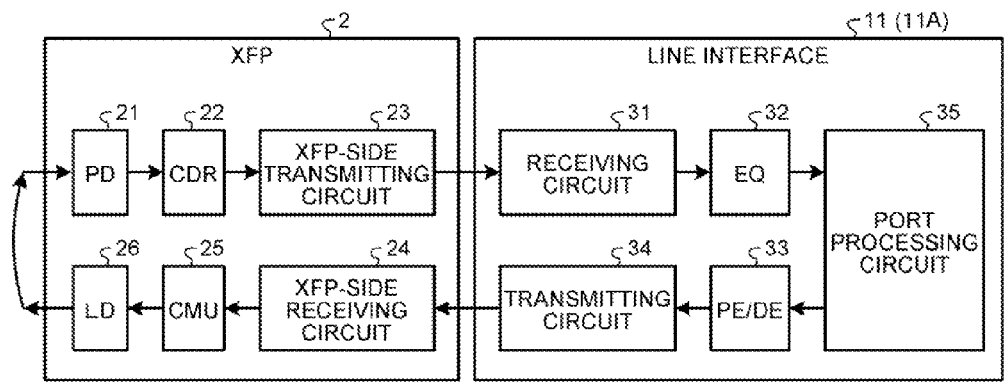
FIG. 3 is an explanatory diagram illustrating an example of each of an XFP and a line interface (port processing circuit)
Figure 4:
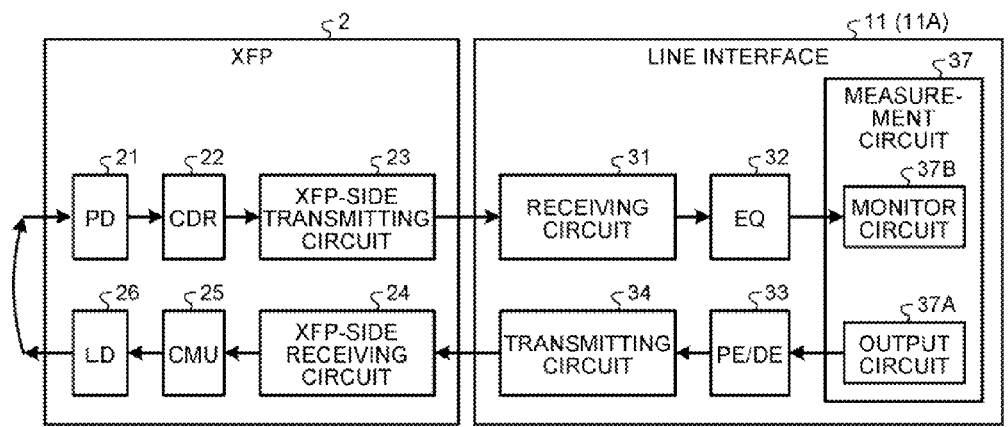
FIG. 4 is an explanatory diagram illustrating an example of each of the XFP and the line interface (measurement circuit)

FIG. 3 is an explanatory diagram illustrating an example of each of the XFP 2 and the line interface 11 (port processing circuit 35). FIG. 4 is an explanatory diagram illustrating an example of each of the XFP 2 and the line interface 11 (measurement circuit 37). Note that FIGS. 3 and 4 are figures focusing on one XFP 2 and one line interface 11 among the plurality of XFPs 2 and line interfaces 11 in the transmission device 1. The FPGA control unit 13 configures a circuit in the FPGA 3 based on the configuration information stored in the flash memory 4. The FPGA control unit 13 configures the port processing circuit 35 in the line interface 11A as illustrated in FIG. 3 based on the configuration information 4A stored in the flash memory 4, for example. The FPGA control unit 13 detects a replacement connection of the XFP 2 with respect to the communication ports A to E. For example, upon detecting a replacement connection of the XFP 2 with respect to the communication port A, the FPGA control unit 13 reads out the configuration information 4G of the measurement circuit 37 in the flash memory 4. Further, the FPGA control unit 13 configures the measurement circuit 37 as illustrated in FIG. 4 in a portion of the port processing circuit 35 in the line interface 11A, which is connected to the communication port A, based on the configuration information 4G of the read measurement circuit 37.

The measurement circuit 37 includes an output circuit 37A and a monitor circuit 37B. The output circuit 37A outputs a PRBS (Pseudorandom Binary Sequence) signal indicating a test sequence of a pseudo-random number binary sequence to the XFP 2. The monitor circuit 37B monitors the PRBS signal returned by the XFP 2.

The FPGA control unit 13 detects a replacement connection of the XFP 2 with respect to the communication port of the FPGA 3, and determines whether the loop-back connection with the XFP 2 has been detected. Note that after connecting the XFP 2 to the transmission device 1, a user connects the PD 21 and the LD 26 in the XFP 2 with a cable, thereby establishing a loop-back connection.

The FPGA control unit 13 configures the measurement circuit 37 in the portion of the port processing circuit 35 in the line interface 11 of the loop-back connection. The measurement circuit 37 executes receiving-side parameter acquisition processing and transmitting-side parameter acquisition processing based on the PRBS signal. In the receiving-side parameter acquisition processing, the monitor circuit 37B of the measurement circuit 37 acquires the receiving-side parameters of the receiving circuits 31 and EQ 32 in the line interface 11, which is connected to the XFP 2, based on the monitoring result of the PRBS signal. The FPGA control unit 13 stores the receiving-side parameters and identification information of the XFP 2 into the FPGA memory 12 in a manner correlated with the line interface 11. Note that the receiving-side parameters indicate the receiving sensitivity of the receiving circuit 31, the EQ set value of the EQ 32, and the like.

In the transmitting-side parameter acquisition processing, the monitor circuit 37B acquires the transmitting-side parameters of the transmitting circuit 34 and the PE/DE 33 in the line interface 11, which is connected to the XFP 2, based on the monitoring result of the PRBS signal. The FPGA control unit 13 stores the transmitting-side parameters and identification information of the XFP 2 in the FPGA memory 12 in a manner correlated with the line interface 11. Note that the transmitting-side parameters indicate the amplitude output value of the transmitting circuit 34, the PE set value and DE set value of the PE/DE 33, and the like.

The FPGA control unit 13 is set in the receiving circuit 31 and the EQ 32 in the line interface 11, which is connected to the XFP 2, based on the receiving-side parameter corresponding to the XFP 2 in the FPGA memory 12. The FPGA control unit 13 is set in the transmitting circuit 34 and the PE/DE 33 in the line interface 11, which is connected to the XFP 2, based on the transmitting-side parameter corresponding to the XFP 2 in the FPGA memory 12.

Figure 5B:
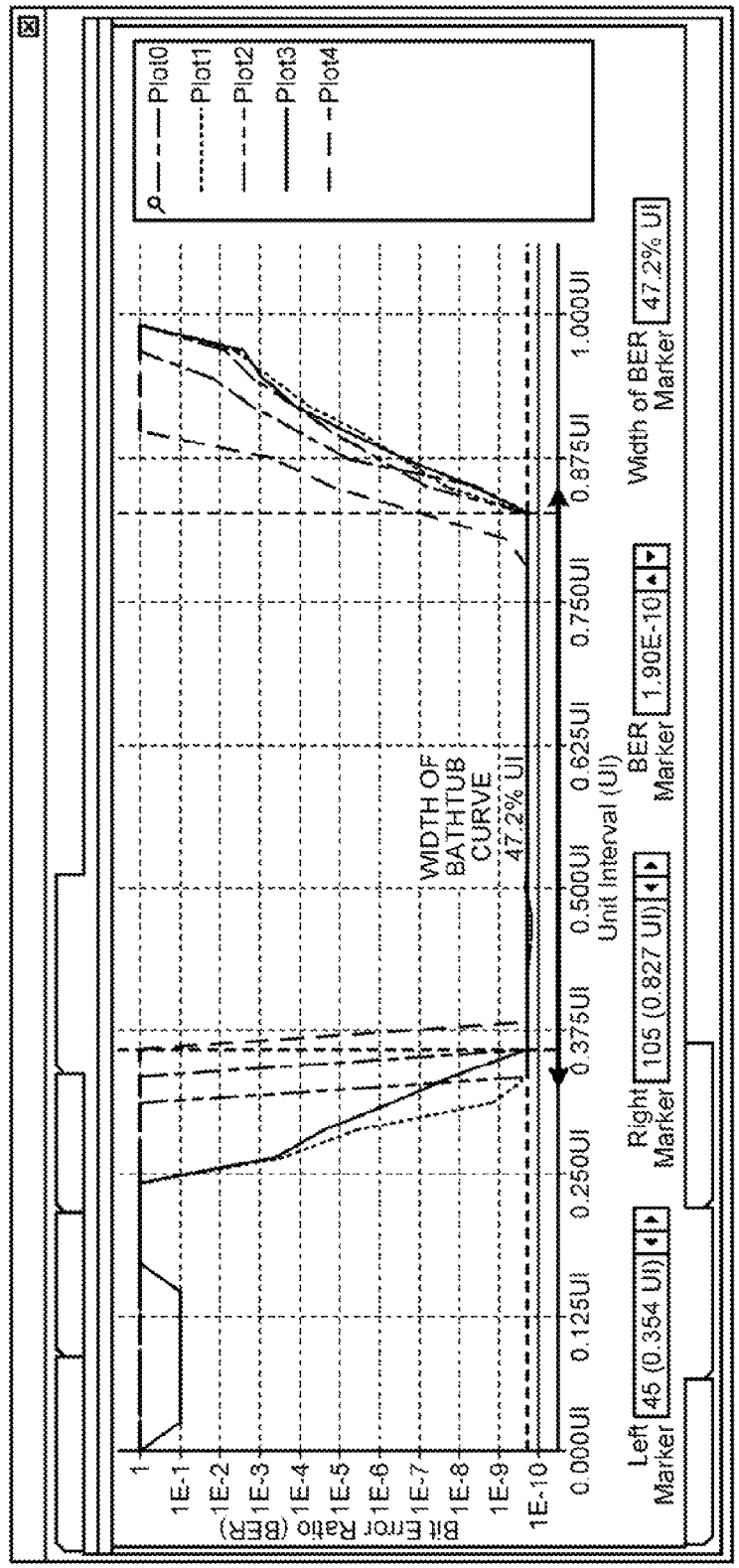
FIG. 5B is an explanatory diagram illustrating an example of the bathtub curve.

The output circuit 37A transmits the PRBS signal to the monitor circuit 37B through a loopback path represented as the PE/DE 33→the transmitting circuit 34→the XFP-side receiving circuit→the CMU 25→the LD→the PD 21→the CDR 22→the XFP-side transmitting circuit 23→the receiving circuit 31→the EQ 32. The monitor circuit 37B generates a bathtub curve, which is described later, based on the monitoring result of the PRBS signal. FIGS. 5A and 5B are explanatory diagrams each illustrating an example of the bathtub curve. Each of the bathtub curves illustrated in FIGS. 5A and 5B is a curve plotted with EQ set values for each receiving sensitivity, assuming that the longitudinal axis represents a bit error rate (hereinafter referred to simply as an error rate) and the horizontal axis represents time. Note that the receiving sensitivity changes in a plurality of steps and the EQ set value also changes in a plurality of steps. FIG. 5A illustrates five bathtub curves with five EQ set values having a receiving sensitivity "1". FIG. 5B illustrates five bathtub curves with five EQ set values having a receiving sensitivity "2".

Figure 6:
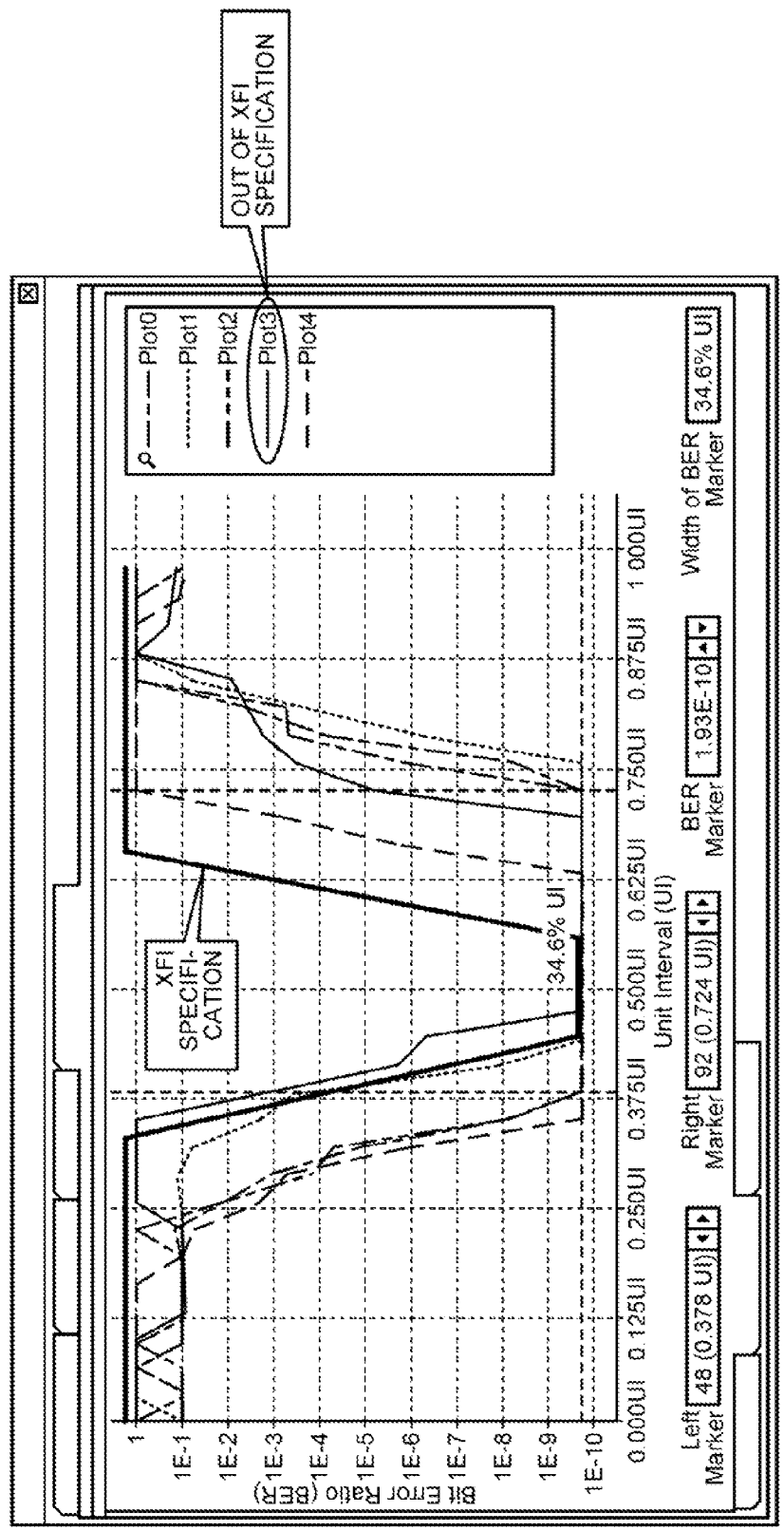
FIG. 6 is an explanatory diagram illustrating an example of the relationship between each bathtub curve and the XFI specification.

FIG. 6 is an explanatory diagram illustrating an example of the relationship between each bathtub curve and the XFI specification. The monitor circuit 37B defaults the output amplitude value, the PE set value, the DE set value, the receiving sensitivity, and the EQ set value in the line interface 11, and then generates a bathtub curve for each EQ set value in units of receiving sensitivity.

The monitor circuit 37B determines a bathtub curve that falls out of a standard line of the XFI specification, among the bathtub curves for each EQ set value in units of receiving sensitivity, as a bathtub curve compliant with the XFI specification. Note that in the example illustrated in FIG. 6, the bathtub curves of Plot0 to Plot2 and Plot4 comply with the XFI specification. The monitor circuit 37B selects a bathtub curve having a maximum width at an error free (1E-10) portion of the error rate, from among a plurality of bathtub curves compliant with the XFI specification. The monitor circuit 37B acquires, as the receiving-side parameters, the receiving sensitivity of the receiving circuit 31 and the EQ set value of the EQ 32 from the selected bathtub curve. The FPGA control unit 13 stores the receiving-side parameters and the identification information of the XFP 2 in the FPGA memory 12 in a manner correlated with the line interface 11.

The monitor circuit 37B determines a bath-tub curb that falls within the standard line of the XFI specification, as a bathtub curve that does not comply with the XFI specification, among the bathtub curves of the EQ set values for each receiving sensitivity. Note that in the example illustrated in FIG. 6, the bathtub curve of Plot3 does not comply with the XFI specification. The bathtub curve that does not comply with the XFI specification is not used for normal service operation, but is used for limited operation such as maintenance and operation.

Figure 7:
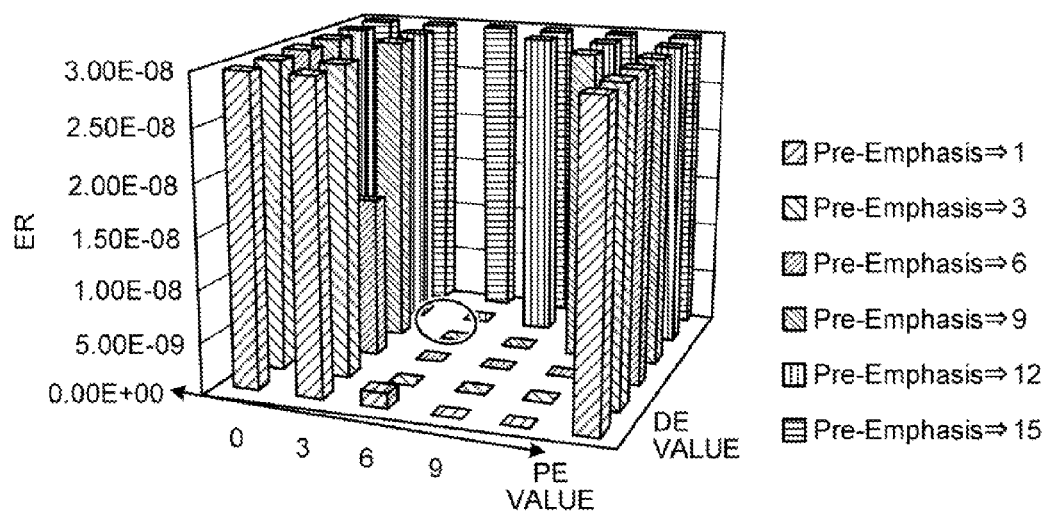
FIG. 7 is an explanatory diagram illustrating an example of a bar graph showing the summarization of error rates.

FIG. 7 is an explanatory diagram illustrating an example of a bar graph showing the summarization of error rates. The bar graph illustrated in FIG. 7 is a graph obtained by summarizing error rates for each of the PE set value and DE set value in units of the output amplitude value of the transmitting circuit 34, assuming that the longitudinal axis represents an error rate; the horizontal axis represents the PE set value, and the axis in the depth direction represents the DE set value. Note that each of the output amplitude value, the DE set value, and the PE set value changes in a plurality of steps. The output amplitude values are, for example, 250 mV, 350 mV, 450 mV, 550 mV, and 650 mV. The monitor circuit 37B defaults the output amplitude value, the PE set value, the DE set value, the receiving sensitivity, and the EQ set value. The monitor circuit 37B changes the PE set value and the DE set value in units of the output amplitude value and generates a bar graph representing the summarization of error rates. The monitor circuit 37B selects a bar graph at which the error rate is minimum, i.e., which has a minimum error rate, from among a plurality of bar graphs for each output amplitude value. Note that in the example illustrated in FIG. 7, the encircled bar graph is a bar graph having a minimum error rate. The monitor circuit 37B acquires, as the transmitting-side parameters, the output amplitude value of the transmitting circuit 34 and the PE set value and DE set value of the PE/DE 33 based on the selected bar graph. The FPGA control unit 13 stores the transmitting-side parameter and the identification information of the XFP 2 in the FPGA memory 12 in a manner correlated with the line interface 11.

The FPGA control unit 13 reads out the transmitting-side parameter and receiving-side parameter stored in the FPGA memory 12. The FPGA control unit 13 sets the read transmitting-side parameter and receiving-side parameter to the receiving circuit 31, the EQ 32, the PE/DE 33, and the transmitting circuit 34 in the line interface 11. The FPGA control unit 13 reads out the configuration information of the port processing circuit 35, which is stored in the flash memory 4, and reconfigures the port processing circuit 35 in a portion of the measurement circuit 37 within the line interface 11 based on this configuration information.

Figure 8:
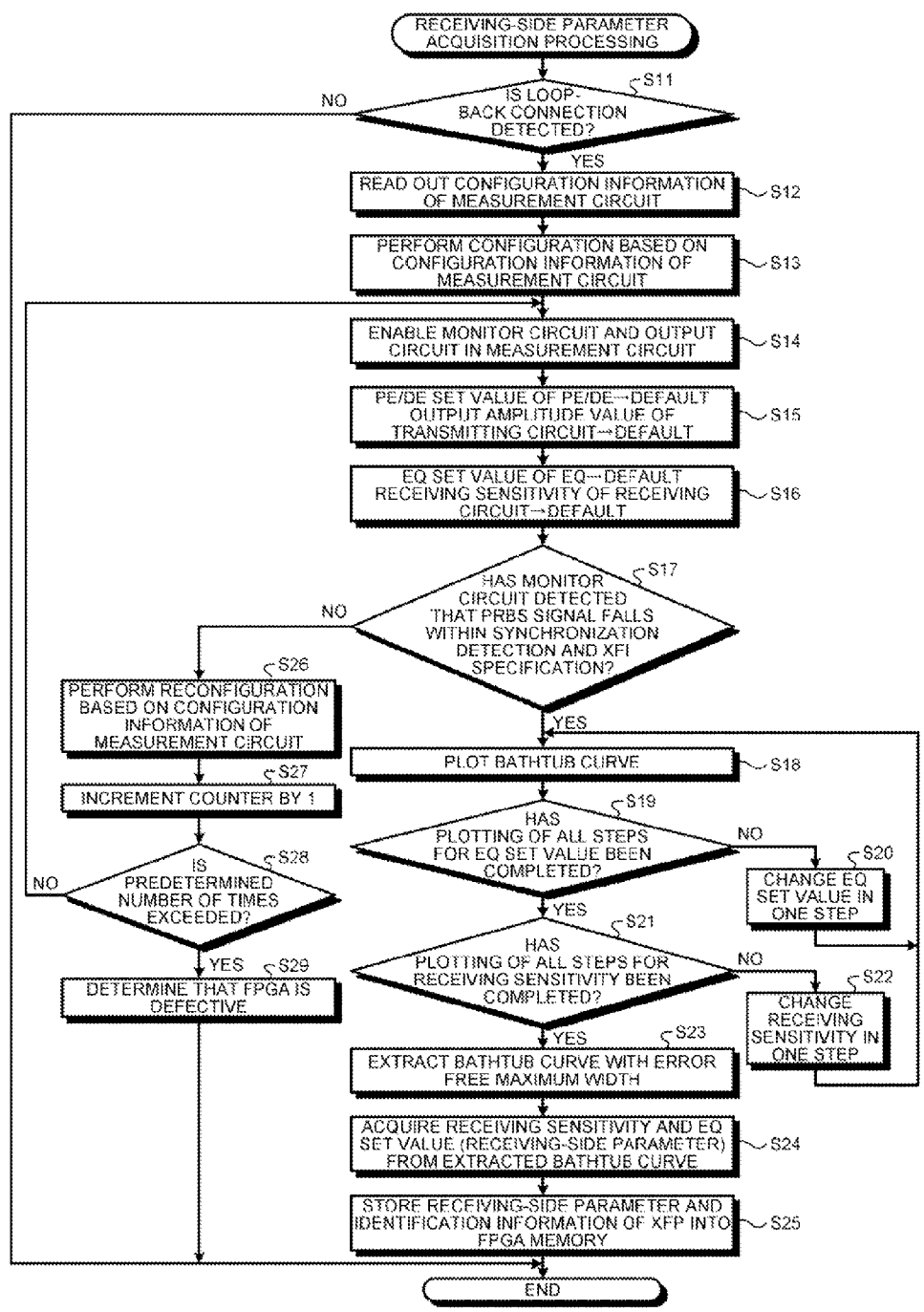
FIG. 8 is a flowchart illustrating an example of a processing operation of FPGA related to receiving-side parameter acquisition processing.

Next, the operation of the transmission device 1 of the first embodiment will be described. FIG. 8 is a flowchart illustrating an example of processing operation of the FPGA 3 of the receiving-side parameter acquisition processing. When the XFP 2 to be connected to the FPGA 3 is replaced, the user connects the PD 21 on the side of the XFP 2 to the LD 26.

Referring to FIG. 8, the FPGA control unit 13 of the FPGA 3 determines whether the loop-back connection of the XFP 2 has been detected (step S11). Upon detecting the loop-back connection (Yes in step S11), the FPGA control unit 13 reads out the configuration information 4G of the measurement circuit 37 stored in the flash memory 4 (step S12). The FPGA control unit 13 configures the measurement circuit 37 in the portion of the port processing circuit 35 within the line interface 11 to be connected to the XFP 2, based on the read configuration information 4G of the measurement circuit 37 (step S13).

The FPGA control unit 13 enables the output circuit 37A and the monitor circuit 37B within the measurement circuit 37 (step S14). The measurement circuit 37 defaults the PE set value, the DE set value, and the output amplitude value (step S15). The measurement circuit 37 defaults the EQ set value and the receiving sensitivity (step S16).

The monitor circuit 37B determines whether the PRBS signal falls within the synchronization detection and the XFI specification (step S17). When the PRBS signal falls within the synchronization detection and the XFI specification (Yes in step S17), the monitor circuit 37B plots a bathtub curve (step S18). The monitor circuit 37B determines whether plotting of all steps for the EQ set value has been completed (step S19).

When plotting of all steps for the EQ set value has not been completed (No in step S19), the monitor circuit 37B changes the EQ set value in one step (step S20), and shifts to step S18 to plot a bathtub curve. When plotting of all steps for the EQ set value has been completed (YES in step S19), the monitor circuit 37B determines whether plotting of all steps for the receiving sensitivity of the receiving circuit 31 has been completed (step S21).

When plotting of all steps for the receiving sensitivity has not been completed (No in step S21), the monitor circuit 37B changes the receiving sensitivity in one step (step S22), and shifts to step S18 to plot a bathtub curve with the changed receiving sensitivity. When plotting of all steps for the receiving sensitivity has been completed (Yes in step S21), the monitor circuit 37B extracts a bathtub curve having a maximum width at an error free portion (1E-10) from the plurality of bathtub curves (step S23). Note that in the example illustrated in FIG. 6, the bathtub curve having the maximum width corresponds to the bathtub curve of Plot 1. The monitor circuit 37B acquires, as the receiving-side parameters, the receiving sensitivity and the EQ set value from the extracted bathtub curve (step S24). The monitor circuit 37B stores the identification information of the XFP 2 and the receiving-side parameters into the FPGA memory 12 in a manner correlated with the line interface 11 (step S25), and terminates the processing operation illustrated in FIG. 8.

When the PRBS signal does not fall within the synchronization detection and the XFI specification (No in step S17), the monitor circuit 37B reconfigures the measurement circuit 37 in the line interface 11 based on the configuration information 4G of the read measurement circuit 37 (step S26). The monitor circuit 37B increments, by 1, a count value obtained by counting the number of reconfigurations (step S27), and determines whether the count value has exceeded a predetermined number of times (step S28). Note that in the monitor circuit 37B, when the measurement circuit 37 is reconfigured, the PRBS signal may fall within the synchronization detection and the XFI specification. For this reason, the predetermined number of times is set assuming that the number of times of reconfigurations is set as an upper limit.

When the count value exceeds the predetermined number of times (Yes in step S28), the monitor circuit 37B determines that the FPGA 3 is defective (step S29), and terminates the processing operation illustrated in FIG. 8. Note that when determining that the FPGA 3 is defective, the FPGA control unit 13 outputs information indicating that the FPGA 3 is defective. As a result, the user can recognize an individual defect of the FPGA 3 by the information output. When the count value does not exceed the predetermined number time (No in step S28), the FPGA control unit 13 shifts to step S14 to enable the monitor circuit 37B and the output circuit 37A. When the loop-back connection is detected (No in step S11), the FPGA control unit 13 terminates the processing operation illustrated in FIG. 8.

The measurement circuit 37 of the receiving-side parameter acquisition processing illustrated in FIG. 8 defaults the output amplitude value, the PE set value, the DE set value, the receiving sensitivity, and the EQ set value, and then changes the EQ set value for each receiving sensitivity and measures the error rate, thereby generating a plurality of bathtub curves. The measurement circuit 37 selects a bathtub curve having a maximum error free width which complies with the XFI specification, from among the plurality of bathtub curves. The measurement circuit 37 can acquire, as the receiving-side parameters, the receiving sensitivity and the EQ set value from the selected bathtub curve.

Figure 9:
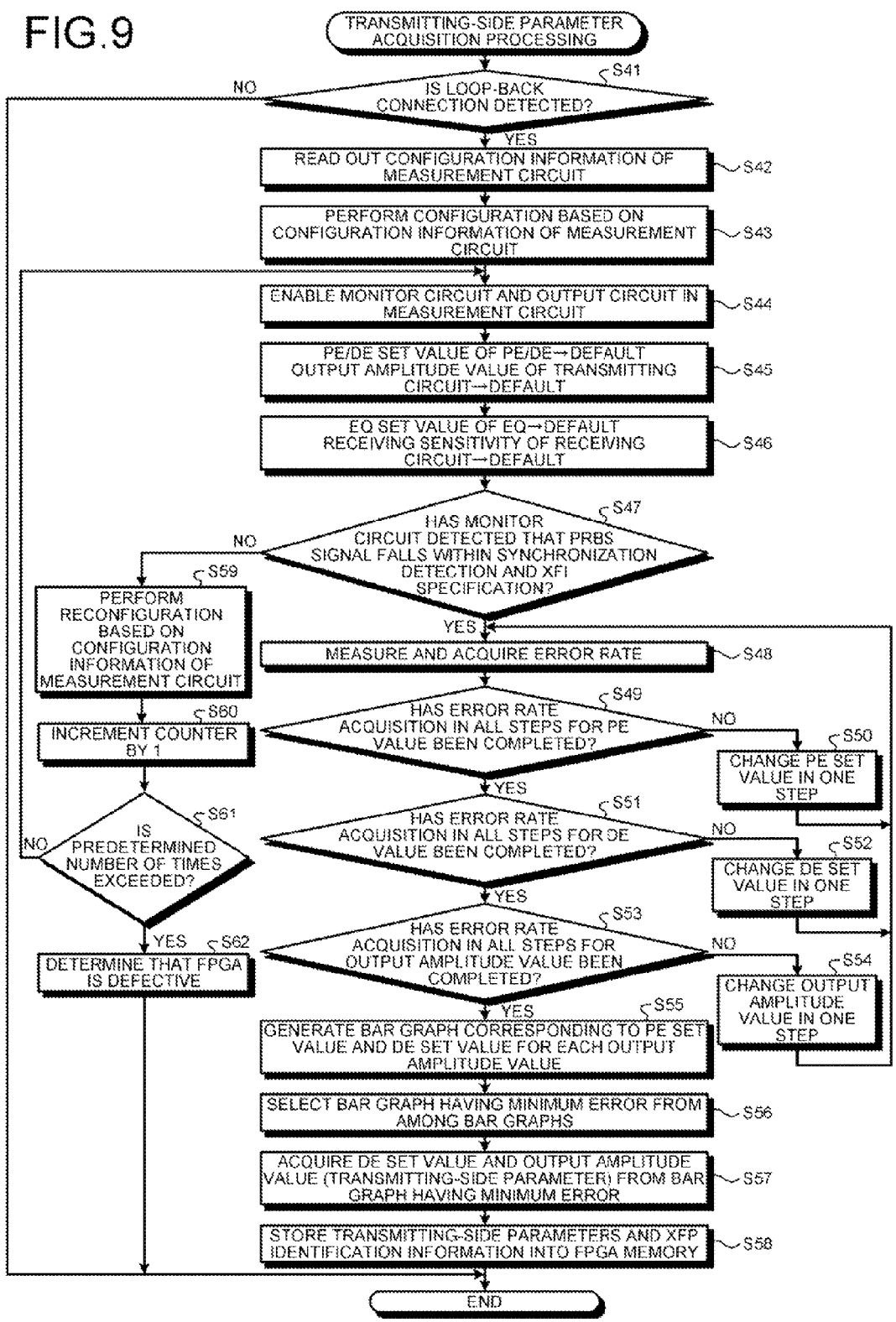
FIG. 9 is a flowchart illustrating an example of the processing operation of FPGA related to transmitting-side parameter acquisition processing.

FIG. 9 is a flowchart illustrating an example of the processing operation of the FPGA 3 related to the transmitting-side parameter acquisition processing. Referring to FIG. 9, the FPGA control unit 13 of the FPGA 3 determines whether the loop-back connection of the XFP 2 has been detected (step S41). Upon detecting the loop-back connection (Yes in step S41), the FPGA control unit 13 reads out the configuration information 4G of the measurement circuit 37 stored in the flash memory 4 (step S42). The FPGA control unit 13 configures the measurement circuit 37 in a portion of the port processing circuit 35 in the line interface 11 connected to the XFP 2, based on the configuration information 4G of the read measurement circuit 37 (step S43).

The FPGA control unit 13 enables the output circuit 37A and the monitor circuit 37B in the measurement circuit 37 (step S44). The measurement circuit 37 defaults the PE set value, DE set value, and the output amplitude value (step S45). The measurement circuit 37 defaults the EQ set value and the receiving sensitivity (step S46).

The monitor circuit 37B determines whether the PRBS signal falls within the synchronization detection and the XFI specification (step S47). When the PRBS signal falls within the synchronization detection and the XFI specification (Yes in step S47), the monitor circuit 37B measures and acquires an error rate based on the monitoring result of the PRBS signal (step S48).

The monitor circuit 37B determines whether the error rate acquisition in all steps for the PE set value has been completed (step S49). When the error rate acquisition in all steps for the PE set value has not been completed (No in step S49), the monitor circuit 37B changes the PE set value in one step (step S50), and shifts to step S48 to measure and acquire an error rate. When the error rate acquisition in all steps for the PE set value has been completed (Yes in step S49), the monitor circuit 37B determines whether the error rate acquisition in all steps for the DE set value has been completed (step S51).

When the error rate acquisition in all steps for the DE set value has not been completed (No in step S51), the monitor circuit 37B changes the DE set value in one step (step S52), and shifts to step S48 to measure and acquire an error rate. When the error rate acquisition in all steps for the DE set value has been completed (Yes in step S51), the monitor circuit 37B determines whether the error rate acquisition in all steps for the output amplitude value has been completed (step S53). When the error rate acquisition in all steps for the output amplitude value has been completed (No in step S53), the monitor circuit 37B changes the output amplitude value in one step (step S54), and shifts to step S48 to measure and acquire an error rate. When the error rate acquisition in all steps for the output amplitude value has been completed (Yes in step S53), the monitor circuit 37B generates a bar graph representing the summarization of error rates corresponding to the PE set value and the DE set value in units of the output amplitude value (step S55).

In short, the monitor circuit 37B measures and acquires the error rate of each PE set value for each DE set value in units of the output amplitude value. Finally, the monitor circuit 37B measures and acquires the error rates corresponds to the DE set value and the PE set value in units of the output amplitude value.

The monitor circuit 37B selects a bar graph having a minimum error from among a plurality of bar graphs (step S56), and acquires, as the transmitting-side parameters, the PE set value, the DE set value, and the output amplitude value from the bar graph having a minimum error (step S57). Further, the monitor circuit 37B stores the identification information of the XFP 2 and the transmitting-side parameters into the FPGA memory 12 in a manner correlated with the line interface 11 (step S58), and terminates the processing operation illustrated in FIG. 9.

When the PRBS signal does not fall within the synchronization detection and the XFI specification (No in step S47), the monitor circuit 37B reconfigures the measurement circuit 37 in the line interface 11 based on the configuration information 4G of the read measurement circuit 37 (step S59). The monitor circuit 37B increments, by 1, the count value obtained by counting the number of reconfigurations (step S60), and determines whether the count value has exceeded the predetermined number of times (step S61).

When the count value exceeds the predetermined number of times (Yes in step S61), the monitor circuit 37B determines that the FPGA 3 is defective (step S62), and terminates the processing operation illustrated in FIG. 9. Note that when determining that the FPGA 3 is defective, the FPGA control unit 13 outputs information indicating that the FPGA 3 is defective. When the count value does not exceed the predetermined number of times (No in step S61), the FPGA control unit 13 shifts to step S44 to enable the monitor circuit 37B and the output circuit 37A. Upon detecting no loop-back connection (No in step S41), the FPGA control unit 13 terminates the processing operation illustrated in FIG. 9.

The measurement circuit 37 of the transmitting-side parameter acquisition processing illustrated in FIG. 9 defaults the output amplitude value, the PE set value, the DE set value, the receiving sensitivity, and the EQ set value, and then changes the PE set value and the DE set value in units of the output amplitude value and measures an error rate, thereby generating a bar graph. The measurement circuit 37 selects a bar graph having a minimum error from among a plurality of bar graphs. The measurement circuit 37 can acquire, as the transmitting-side parameters, the output amplitude value, the PE set value, and the DE set value from the selected bar graph.

Assume that when the user replaces the first XFP 2 and the PRBS signal does not fall within the synchronization detection and the XFI specification, the monitor circuit 37B replaces the XFP 2 with another XFP 2. Even after the XFP 2 is replaced with another XFP 2, when the PRBS signal does not fall within the synchronization detection and the XFI specification, the monitor circuit 37B can determine an individual defect in the first replaced XFP 2.

Next, the FPGA control unit 13 stores, into the FPGA memory 12, the identification information of the replaced and connected XFP 2, the receiving-side parameters, and the transmitting-side parameters in a manner correlated with the line interface 11. The FPGA control unit 13 reads out the receiving-side parameters and transmitting-side parameters from the FPGA memory 12. The FPGA control unit 13 causes the XFP 2 to set the read receiving-side parameters in the receiving circuit 31 and the EQ 32 in the replaced and connected line interface 11. The FPGA control unit 13 sets the read transmitting-side parameters in the transmitting circuit 34 and the PE/DE 33 in the line interface 11. As a result, the FPGA control unit 13 has adjusted the transmission parameters of the receiving circuit 31, the EQ 32, the PE/DE 33, and the transmitting circuit 34 in the line interface 11 according to the replaced and connected XFP 2.

Then, an operator releases the cable connection between the PD 21 and the LD 26. The FPGA control unit 13 reads out the configuration information of the port processing circuit 35 from the flash memory 4, and reconfigures a portion of the measurement circuit 37 in the port processing circuit 35 based on the configuration information of the read port processing circuit 35.

As a result, when the XFP 2 is replaced and connected, the FPGA 3 adjusts the transmission parameters of the receiving circuit 31, the EQ 32, the PE/DE 33, and the transmitting circuit 34 in the line interface 11, according to this XFP 2. As a result, even when the XFP 2 is replaced and connected, the transmission quality suitable for the XFP 2 can be secured.

When the XFP 2 is replaced and the loop-back connection between the XFP 2 and the line interface 11 is detected, the FPGA control unit 13 of the first embodiment configures the port processing circuit 35, which is provided in the line interface 11, in the measurement circuit 37. The measurement circuit 37 acquires the receiving-side parameters and transmitting-side parameters based on the monitoring result of the PRBS signal between the XFP 2 and the line interface 11. The FPGA control unit 13 sets the acquired receiving-side parameters and transmitting-side parameter in the receiving circuit 31, the EQ 32, the PE/DE 33, and the transmitting circuit 34 in the line interface 11. As a result, even when the XFP 2 is replaced, the transmission quality suitable for the XFP 2 can be secured.

In addition, after acquiring the receiving-side parameters and transmitting-side parameters, the FPGA control unit 13 reconfigures the measurement circuit 37, which is provided in the line interface 11, in the port processing circuit 35, thereby securing the transmission quality suitable for the replaced XFP 2.

In the first embodiment, there is no need to dispose a repeater for adjusting the transmission quality between the XFP 2 and the line interface 11. This leads to a reduction in mounting area and power consumption by the amount of the repeater.

In the first embodiment, the measurement circuit 37 can determine whether the XFI specification is satisfied or not, thereby enabling determination as to whether the replaced and connected XFP 2 complies with the XFI specification.

The line interface 11 in the FPGA 3 of the first embodiment connects the PD 21 and the LD 26 within the XFP 2 with a cable to form a loop-back path with the XFP 2. As a result, the operator can easily form a loop-back path between the XFP 2 and the line interface 11 by a connection operation.

Note that the above-mentioned first embodiment has described the receiving-side parameter acquisition processing and the transmitting-side parameter acquisition processing. Alternatively, after execution of the receiving-side parameter acquisition processing, the transmitting-side parameter acquisition processing may be executed. More alternatively, after execution of the transmitting-side parameter acquisition processing, the receiving-side parameter acquisition processing may be executed. The transmitting-side parameter acquisition processing and the receiving-side parameter acquisition processing may be executed in parallel.

In the above-mentioned first embodiment, a plurality of bathtub curves is generated in the receiving-side parameter acquisition processing. However, the curves are not limited to the bathtub curves as long as the receiving-side parameters can be acquired from the monitoring result of the PRBS signal. Further, in the first embodiment described above, a plurality of bar graphs is generated in the transmitting-side parameter acquisition processing. However, the graphs are not limited to the bar graphs as long as the transmitting-side parameters can be acquired from the monitoring result of the PRBS signal.

In the above-mentioned first embodiment, the receiving sensitivity, the amplitude output value, the EQ set value, the PE set value, the DE set value, and the like are changed per step, but the amount of change per step can be arbitrarily changed.

In steps S49 and S50 of the transmitting-side parameter acquisition processing of the first embodiment described above, the PE set value is targeted. Alternatively, the DE set value may be targeted. In this case, steps S51 and S52 use the PE set value.

In the above-mentioned first embodiment described above, a loop-back is formed by connecting the PD 21 and the LD 26 of the XFP 2 with a cable, but the present invention is not limited thereto. Another configuration will be described below as a second embodiment.

[b] Second Embodiment

Figure 10:
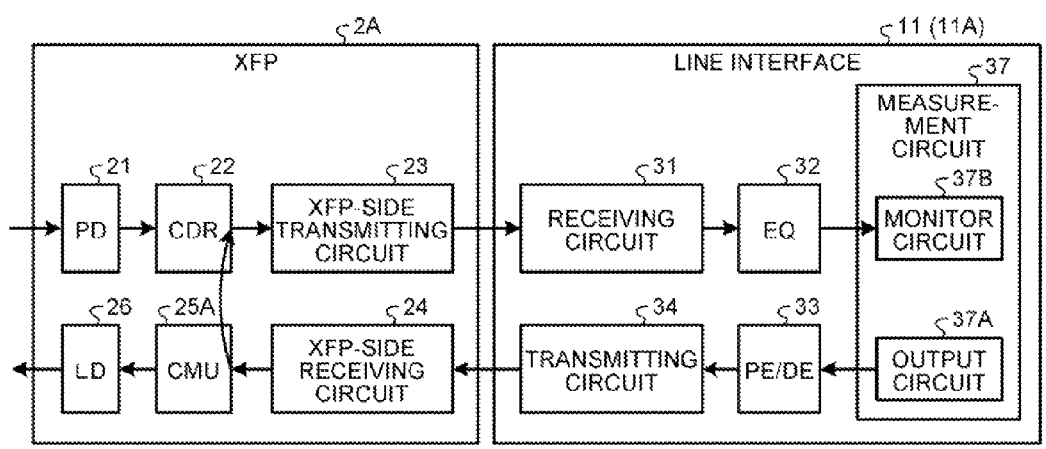
FIG. 10 is an explanatory diagram illustrating an example of an XFP and a line interface (measurement circuit) of a second embodiment.

FIG. 10 is an explanatory diagram illustrating an example of each of an XFP 2A and the line interface 11 (measurement circuit 37) of the second embodiment. Note that the same components as those of the transmission device 1 of the first embodiment are denoted by the same reference numerals, so the repeated description of the configuration and operation thereof will be omitted.

A CMU 25A within the XFP 2A illustrated in FIG. 10 incorporates a path switching function for forming a communication path with the CDR 22 upon detection of a replacement connection with the line interface 11 within the FPGA 3. As a result, the line interface 11 and the XFP 2A form a loop-back path represented as the measurement circuit 37→the PE/DE 33→the transmitting circuit 34→the XFP-side receiving circuit 24→the CMU 25A→the CDR→the XFP-side transmitting circuit 23→the receiving circuit 31→the EQ 32→the measurement circuit 37.

The output circuit 37A within the measurement circuit 37 transmits the PRBS signal to the monitor circuit 37B through a loopback path represented as the PE/DE 33→the transmitting circuit 34→the XFP-side receiving circuit 24→the CMU 25A→the CDR 22→the XFP-side transmitting circuit 23→the receiving circuit 31→the EQ 32. The monitor circuit 37B acquires the receiving-side parameters and the transmitting-side parameters based on the monitoring result of the PRBS signal returned from the XFP 2A. The FPGA control unit 13 sets the receiving-side parameters and the transmitting-side parameters to the receiving circuit 31, the EQ 32, the PE/DE 33, and the transmitting circuit 34 in the line interface 11 of the replaced and connected XFP 2A.

When reconfiguring the measurement circuit 37, which is provided in the line interface 11, in the port processing circuit 35, the FPGA control unit 13 transmits a path release signal to the XFP 2A. Note that also before reconfiguration of the measurement circuit 37 in the port processing circuit 35, the FPGA control unit 13 may transmit the path release signal to the XFP 2A when the measurement circuit 37 stores the receiving-side parameters and the transmitting-side parameters into the FPGA memory 12. Upon detection of the path release signal, the CMU 25A within the XFP 2A automatically releases the loop-back connection between the CMU 25A and the CDR 22. As a result, the transmission device 1 can secure the transmission quality suitable for the replaced and connected XFP 2A.

The XFP 2A of the second embodiment automatically detects the replacement connection on the side of the XFP 2A and automatically switches and connects the reception path and the transmission path within the XFP 2A, without the need for the operator to perform the cable connection operation. This results in a reduction in load on the operation of the operator.

The XFP 2A of the second embodiment automatically releases the loop-back path in response to the path release signal of the FPGA control unit 13, thereby reducing the load on the operation of the operator.

The illustrated constituent elements of each unit are not necessarily configured physically as illustrated in the drawings. Specifically, specific modes of dispersion and integration of each unit are not limited to those illustrated in the drawings. The whole or a part thereof can be configured by functionally or physically dispersing or integrating the whole or a part thereof in arbitrary units depending on various loads, the use status, and the like.

According to an aspect of the disclosure, the transmission quality suitable for the replaced XFP can be secured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
   a configurable device that configures a port processing circuit based on set configuration information, the port processing circuit being configured to communicate with a connected communication module;
   a memory that stores configuration information for configuring a measurement circuit in the device, the measurement circuit being configured to measure and acquire a transmission parameter for use in communication between the communication module and the port processing circuit; and
   a controller that reads out the configuration information from the memory upon detection of a loop-back connection with the communication module, configures the measurement circuit to change a portion of the port processing circuit into the measurement circuit, based on the read configuration information, and causes the measurement circuit to measure and acquire the transmission parameter.

2. The transmission device according to claim 1, wherein when the measurement circuit acquires the transmission parameter, the controller reconfigures the port processing circuit to change a portion of the measurement circuit into the port processing circuit, and sets the transmission parameter acquired by the measurement circuit.

3. The transmission device according to claim 1, wherein the measurement circuit includes:
   an output circuit that transmits a predetermined pattern to the communication module; and
   a monitor circuit that acquires the transmission parameter based on a monitoring result of the predetermined pattern returned from the communication module.

4. The transmission device according to claim 3, wherein the monitor circuit acquires a receiving-side parameter in the transmission pattern based on a monitoring result for each receiving-side receiving sensitivity related to the predetermined pattern, and
   the controller sets the acquired receiving-side parameter as the transmission parameter.

5. The transmission device according to claim 3, wherein the monitor circuit acquires a transmitting-side parameter in the transmission parameter based on a monitoring result for each transmitting-side output amplitude value related to the predetermined pattern, and
   the controller sets the acquired transmitting-side parameter as the transmission parameter.

6. The transmission device according to claim 3, wherein the communication module receives the predetermined pattern and causes the measurement circuit to return the predetermined pattern by using a loop-back path disposed outside the communication module.

7. The transmission device according to claim 3, wherein the communication module receives the predetermined pattern and causes the measurement circuit to return the predetermined pattern by using a loop-back path disposed in the communication module.

8. The transmission device according to claim 7, wherein the communication module includes a path switching unit that forms a loop-back path in the communication module upon detection of a replacement connection with the transmission device.

9. The transmission device according to claim 8, wherein
when the measurement circuit acquires the transmission parameter, the controller outputs a release signal to the communication module, and the path switching unit in the communication module releases the formed loop-back path in response to the release signal.

10. A transmission method for a transmission device to be connected to a communication module, the transmission method comprising:

configuring a port processing circuit based on set configuration information, the port processing circuit being configured to communicate with a connected communication module; and configuring a measurement circuit to change a portion of the port processing circuit into the measurement circuit, based on configuration information for configuring the measurement circuit upon detection of a loop-back connection with the communication module, the measurement circuit being configured to measure and acquire a transmission parameter for use in communication between the communication module and the port processing circuit; and measuring and acquiring the transmission parameter by using the measurement circuit.

11. The transmission method according to claim 10, further comprising reconfiguring, when the measurement circuit acquires the transmission parameter, the port processing circuit to change a portion of the measurement circuit into the port processing circuit, and setting the transmission parameter acquired by using the measurement circuit.

* * * * *